United States Patent Office 3,499,966
Patented Mar. 10, 1970

3,499,966
QUATERNARY AMMONIUM SALTS OF SUBSTITUTED PHENANTHROLINES AS BACTERICIDES AND FUNGICIDES
Francis Patrick Dwyer, deceased, late of Griffith, Australian Capital Territory, Australia, by Lola Mary Dwyer, executrix, 4 Jansz Crescent, Griffith Australian Capital Territory, Australia; and Roy Douglas Wright, 97 Royal Parade, Parkville, Victoria, Australia; and Albert Shulman, 226 Punt Road, Prahran, Victoria, Australia
No Drawing. Application May 24, 1963, Ser. No. 283,110, now Patent No. 3,338,906, dated Aug. 29, 1967, which is a continuation-in-part of application Ser. No. 84,533, Jan. 24, 1961. Divided and this application May 1, 1967, Ser. No. 649,387
Int. Cl. A61k 27/00; A01n 9/22
U.S. Cl. 424—258     8 Claims

ABSTRACT OF THE DISCLOSURE

Bactericidal composition and method of use of the quaternary ammonium salt of a substituted phenanthroline of the formula:

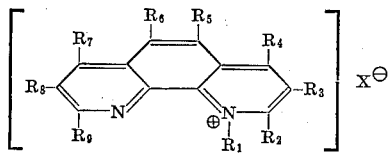

wherein $R_1$ is alkyl or benzyl; $R_2$, $R_3$, $R_8$, and $R_9$ is methyl or hydrogen; $R_4$, $R_5$, $R_6$ and $R_7$ is methyl, phenyl, tolyl or hydrogen.

---

This application is a division of application Ser. No. 283,110, filed May 24, 1963, now U.S. Patent 3,338,906 which in turn is a continuation-in-part of application Ser. No. 84,533, filed Jan. 24, 1961, now abandoned.

This invention relates to new mono N-alkylated derivatives of substituted 1,10-phenanthrolines. The new mono N-alkylated derivatives are quaternary ammonium base cations, with which are associated the anions of inorganic acids, e.g., chloride, sulfate, or of organic acids, e.g., maleate, benzoate. In this specification, the numbering of the 1,10-phenanthroline hereinafter is in agreement with ring No. 1954, page 264, of "The Ring Index," A. M. Patterson and L. T. Capell, Monograph Series, published 1940 by Reinhold Publishing Corporation.

According to the invention there is provided quaternary ammonium salts of the structure

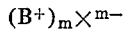

wherein B is a cation of the structure

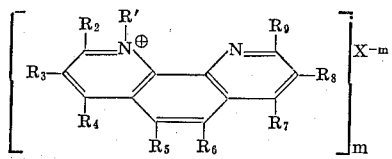

wherein R' is selected from the group consisting of alkyl radicals having up to six carbon atoms and benzyl; wherein $R_2$, $R_3$, $R_4$, $R_5$, $R_6$, $R_7$, $R_8$ and $R_9$ represent a mixture of hydrogen and substituent radicals selected from the group consisting of alkyl, phenyl, tolyl and xylyl; provided that when alkyl substituent radicals are present, there are two to four of such radicals in said R positions and having a total of two to six carbon atoms, with hydrogen in the remaining R positions; and further provided that when a substituent radical selected from phenyl, tolyl and xylyl is present, there is from one to two such radicals in the $R_4$, $R_5$, $R_6$ and $R_7$ positions, with hydrogen in the remaining R positions; wherein X is an anion of an acid selected from inorganic and organic acids; and wherein m is the valency of the anion.

The new quaternary ammonium salts of the invention can be prepared by the method which comprises reacting an appropriately substituted 1,10-phenanthroline base with an alkylating agent which provides the components R' and X as specified, and recovering the desired salt. In carrying out this method, the reaction is brought about usually merely by mixing the reaction components, however, heat may assist in completing the reaction. The components may be mixed alone or in the presence of a solvent such as alcohol or methanol. For volatile alkylating agents a closed system such as a sealed reaction tube is required to prevent loss of the reagent, if heat is used. The product can be isolated by the usual methods such as dissolving the reaction mixture in a solvent, filtering, concentrating and precipitating.

The most suitable alkylating agents are the alkyl halides. Of these the iodides are most reactive, but the less expensive chlorides and bromides can be used. Diethyl and dimethyl sulfates can be used satisfactorily. Examples of alkylating agents are methyl iodide, butyl bromide, dimethyl sulfate. These alkylating agents result in a product in which the anion is a halogen or sulfate. Other anions may be substituted by standard procedures using for example ion exchange resins or double decomposition reactions, for example, the saccharate anion may be imposed as it has value in increasing the water-solubility of the compounds; alternatively, anions such as stearate, oleate, and the like may be imposed in order to decrease water-solubility of the compounds. A representative list of anions include sulfate, chloride, bromide, iodide, phosphate, nitrate, acetate, sulfamate, citrate, lactate, maleate, succinate, tartrate, cinnamate, benzoate, gluconate, ascorbate, saccharate, stearate and oleate.

Compounds in accordance with the invention are useful as therapeutic agents for the treatment of animal and plant diseases induced by a wide variety of organisms. In particular, the compounds are valuable for the treatment of various topical infections in humans, in the treatment of bovine mastitis, in the treatment of plant fungal conditions, and as anthelminthics. These compounds have value in being active against a wide variety of microorganisms, i.e., Gram-positive organisms, Gram-negative organisms, Acid-fast organisms, pathogenic fungi, yeast (*Saccharomyces cereviciae*) and virus (influenza). The compounds are stable in solution and are non-irritant at very high concentrations (1 to 2% solutions) to skin surfaces, mucuous surfaces (eye, ear, nose, throat) mucuous cavities (vagina, gut, bladder) and subcutaneous tissues (muscle, bone).

In the treatment of bovine mastitis, the present compounds are effective clinically in resolving acute and chronic infections due to (Group B) Streptococci or Staphylococcus pyogenes which have proved refractory to the antibiotics in current use for the purpose.

In the treatment of plant diseases due to microorganisms, in particular, plant fungi and nematodes, tests have been conducted against the plant fungi *Venturia inaequalis* and *Phytophthora infestans*, and against the plant nematodes *Panagrellus redivivis* and *Meloidogune incognita*, *Venturia inaequalis* causes "Black Spot" on apples; *Phytophthora infestans* causes "Late Blight" of tomatoes and potatoes; and the nematodes cause root infestations of plants. Excellent control of these organisms has been obtained with several of the present compounds which have been tested.

We believe that the specified mono N-alkylated derivatives of 1,10-phenanthroline according to the invention, exert their therapeutic action by their capacity to bind or attach themselves to essential biological sites (enzymes and proteins) by electrostatic and/or Van der Waals' forces. The binding of the compounds herein to the biologically active sites, whether on the surface or within cells, by Van der Waals' forces is a most important consideration. This is related not only to the geometrical shape of the site but also to the surface area of such compounds. The surface area may be controlled by the amount and nature of ring substitution of the 1,10-phenanthroline bases. N-alkylation of the substituted 1,10-phenanthroline base confers one positive charge on the base and transforms them into cations. We consider that the cation is attracted and partly held, at least, to the biological site because that site has some negative charge, i.e., some anionic charge. The group used for quaternisation of the nitrogen atom has an important effect on the penetrability of the drug.

Ring substitution of the prime base 1,10-phenanthroline with alkyl groups may, as specified above, occur in two to four of the 2-, 3-, 4-, 5-, 6-, 7-, 8- and 9-positions of substitution with similar or dissimilar substituents totaling from two to six carbon atoms. Multisubstitution with alkyl groups as specified is favoured, the tri- and tetra-substituted derivatives being preferred. We have found that tetra-alkyl substitution, particularly 3,4,7,8-tetramethyl and 2,4,7,9-tetramethyl and 3,5,6,8-tetramethyl substitution, contribute to high activity in combatting bacterial infections in humans, symmetrical substitution being preferred; however, dimethyl substitution in the 2- and 9-positions, or, tetramethyl substitution in the 3-, 4-, 5-, and 6-positions also yield highly useful compounds. Similarly, substitution of the prime base, 1,10-phenanthroline with phenyl, tolyl and xylyl groups may, as specified above, occur in one or two of the 4-, 5-, 6- and 7-positions of substitution, and preferably is symmetrical when there are two such substituents.

Some representative examples of compounds prepared in accordance with the invention are as follows:

(1) 1-butyl-3,4,7,8-tetramethyl-1,10-phenanthrolinium bromide
(2) 1-methyl-3,4,7,8-tetramethyl-1,10-phenanthrolinium sulfate
(3) 1-benzyl-4,7-dimethyl-1,10-phenanthrolinium chloride
(4) 1-methyl-5-phenyl-1,10-phenanthrolinium bromide
(5) 1-isopropyl-4,7-diphenyl-1,10-phenanthrolinium bromide These and other compounds according to the invention can be prepared as illustrated in the following practical examples. The starting materials, i.e. the substituted 1,10-phenanthroline base and the alkyl halides are either known or can be prepared by standard procedures.

EXAMPLE 1

1-benzyl-4,7-dimethyl-1,10-phenanthrolinium chloride 4,7-dimethyl-1,10-phenanthroline monohydrate (1 g.) is heated in a sealed tube at 100° C. with benzyl chloride (12 ml.) for 16 hours. The reaction mixture is cooled with ice and 25 ml. of ether added. The oily solid is separated by filtration, dissolved in 10 ml. of boiling water, treated with activated charcoal, and filtered. The aqueous solution is evaporated in an oven at 90° C. and finally dried in a vacuum desiccator over phosphorus pentoxide. The resultant material has a melting point of 94° C.

EXAMPLE 2

1-methyl-3,4,7,8-tetramethyl-1,10-phenanthrolinium iodide 3,4,7,8-tetramethyl-1,10-phenanthroline monohydrate (0.5 g.) is heated at 100° C. in a sealed tube with methyl iodide (0.8 ml.) for one-half hour. The crystals obtained are twice recrystallised from methanol. The resultant material has a melting point of 225° C.

Results of bacteriostatic and fungistatic tests with the compounds listed above as representative examples (1), (2), (3) and (4) of the compounds herein, with respect to inhibitory concentration against the series of microorganisms listed below, expressed in micrograms/milliliter in the medium further specified below, are as follows:

| Test compound | A | B | C | D | E | F | G | H | I | J | K |
|---|---|---|---|---|---|---|---|---|---|---|---|
| (1) | 12.5 | 12.5 | 25 | 100 | 1,000 | 125 | 125 | 125 | 125 | 125 | +500 |
| (2) | 25 | 6.25 | 25 | 50 | 1,000 | | | | | | |
| (3) | 25 | 25 | 25 | 250 | 250 | | | | | | |
| (4) | 50 | 50 | 50 | | | | | | | | |

In the above table the blank spaces in column F to K means that no test details are available, whereas the blank spaces in column D and E mean that the specified compounds were inactive at 100 micrograms/ml. The coded test organisms correspond to the following:

A = *Staphylococcus pyogenes* (Oxford)
B = *Streptococcus pyogenes* (Group A)
C = *Clostridium welchii*
D = *Escherischia coli*
E = *Proteus vulgaris*
F = *Microsporum canis*
G = *Trichophyton mentoprophytes*
H = *Trichophyton rubrum*
I = *Trichophyton sulphurum*
J = *Epidermophyton flocccum*
K = *Candida albicans* (solid medium)

The tests against the gram-positive and gram-negative organisms were carried out in 2.5 ml. quantities of sterile "Difco" Haarlowra Infusion Broth containing 10% horse serum and the test compound. In the case of Cl. welchii, 2 drops of a sterile 10% sodium thioglycollate solution were added asceptically to the medium. The inoculum in each case was a drop (0.02 ml.) of an 18 hour culture of the organism and the incubation period at 37° C. was 48 hours. The tests against the pathogenic fungi were carried out on 4% malt agar slopes containing the test compound. In the case of compounds sparingly soluble in water but soluble in ethanol, a single test was carried out against *Candida albicans* in 4% malt extract medium (2 ml.). The inoculum in the solid medium was a small piece of fungus and in the liquid medium one drop (0.02 ml.) of a 48 hour culture of the organism. The incubation period in the solid medium was 28 days at 26° C. and in the liquid medium 48 hours at 26° C.

The therapeutic value of 1-N-methyl-3,4,7,8-tetra-methyl-1,10-phenanthrolinium iodide in the treatment of acute and chronic staphylococcal and streptococcal bovine mastitis was investigated. All chronic infections had failed to respond to pencillin therapy. Local treatment with each compound (50–100 mg. twice daily in a paraffin and wax base) was given, and the chemical and bacteriological course of the administration was followed in each case until the conditions were resolved. The specified compound resolved the conditions.

The plant fungicidal value of 1-N-methyl-3,4,7,8-tetra-methyl-1,10-phenanthrolinium iodide was tested on *Venturia inaequalis* and *Phytophthora infestans*. The compound gave excellent fungicidal results at a concentration of 100 p.p.m. against both organisms.

Application of the present compounds in the fields of animal and plant therapy is effected by means of a carrier or diluent for the compound. For example, in the therapeutic treatment of bacterial infections in humans, the compound is applied in forms such as saline solutions, creams, lotions, nose or eye or ear drops, pessaries, suppositories, tablets, lozenges and the like. A dermatological or vaginal cream may contain 10 mgm./gm. of the compound in the cream base; a lotion may contain 10 mgm./ml. of the compound; a saline solution may contain 5–10 mgm./ml. of the compound; nose drops may contain 10 mgm./ml. of the compound in saline; eye drops may contain 4 mgm./ml. of the compound in saline; ear drops may contain 10 mgm./ml. of the compound in propylene glycol; 5 grams pessaries and suppositories may contain 50 mgm. of the compound; and 500 mgm. oral tablets may contain 250 mgm. of the compound. Likewise, in veterinary treatments, such as bovine mastitis, the compounds are applied in a suitable carrier media, such as paraffin and wax base, whilst in veterinary anthelminthic preparations, the compounds are applied conveniently as a drench, preferably as an aqueous solution or aqueous suspension of the compounds, depending upon its water solubility. When applied as plant fungicides or as plant virocides, the water-insoluble compounds conveniently are formulated as dispersible powders, whilst the water-soluble compounds are formulated as aqueous solutions, however, concentrate-forms of the compounds in organic solvent solutions may be prepared for further use, such as the preparations of aqueous emulsions of the compounds, and, any of these formulations may include wetting agents and/or other materials of assistance in formulating the compounds or in their end use.

We claim:

1. A method of controlling microorganisms on an animal selected from the class consisting of bacteria and fungi which comprises topically applying to said animal an anti-microbial amount of a quaternary ammonium salt of a substituted 1,10-phenanthroline of the formula:

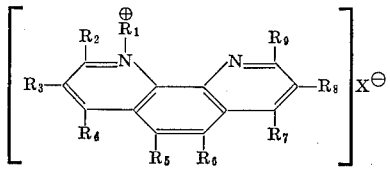

wherein $R_1$ is alkyl of up to four carbon atoms; wherein two to four of the $R_2$, $R_3$, $R_4$, $R_5$, $R_6$, $R_7$, $R_8$ and $R_9$ are methyl and the remainder are hydrogen; and wherein X is a halide anion selected from the class consisting of bromide, chloride and iodide.

2. A method in accordance with claim 1 wherein the quaternary ammonium salt of the substituted 1,10-phenanthroline is 1-butyl-3,4,7,8-tetramethyl-1,10 - phenantrolinium bromide.

3. A method in accordance with claim 1 wherein the quaternary ammonium salt of the substituted 1,10-phenanthroline is 1-methyl-3,4,7,8-tetramethyl-1, 10 - phenanthrolinium iodide.

4. A method of controlling microorganisms on an animal selected from the class consisting of bacteria and fungi which comprises topically applying to said animal an anti-microbial amount of a quaternary ammonium salt of a substituted 1,10-phenanthroline of the formula:

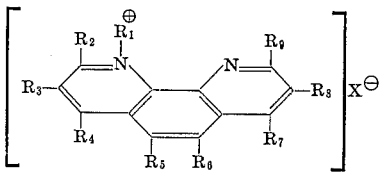

wherein $R_1$ is alkyl of up to four carbon atoms, $R_2$, $R_3$, $R_8$, and $R_9$ are hydrogen and from one to two of $R_4$, $R_5$, $R_6$ and $R_7$ are selected from the class consisting of phenyl, tolyl and xylyl; wherein X is a halide anion selected from the class consisting of chloride, bromide and iodide.

5. A method in accordance with claim 4 wherein the quaternary ammonium salt of the substituted 1,10-phenanthroline is 1-methyl-5-phenyl-1,10 - phenanthrolinium bromide.

6. A method in accordance with claim 5 wherein the quaternary ammonium salt of the substituted 1,10 phenanthroline is 1-isopropyl-4,7-diphenyl-1,10-phenanthrolinium bromide.

7. A method of controlling microorganisms on an animal selected from the class consisting of bacteria and fungi which comprises topically applying to said animal an anti-microbial amount of 1-benzyl-4,7-dimethyl-1,10-phenanthrolinium chloride.

8. A method of controlling microorganisms on an animal selected from the class consisting of bacteria and fungi which comprises topically applying to said animal an anti-microbial amount of 1-methyl-3,4,7,8-tetramethyl-1,10-phenanthrolinium sulfate.

References Cited

UNITED STATES PATENTS

| | | | |
|---|---|---|---|
| 2,617,753 | 11/1952 | Gysin et al. | 260—288 |
| 2,640,830 | 6/1953 | Druey | 260—288 |
| 2,651,636 | 9/1953 | Wheeler | 260—288 |
| 2,809,146 | 10/1957 | Osborn | 424—245 |
| 3,147,182 | 9/1964 | Masci | 424—25 |

OTHER REFERENCES

Frear, Chemistry of the Pesticides, Van Nostrand, 3rd ed., 1955, pages 301–2.

Halcrow et al., P. Chem. Soc. (London) 1946, pages 155–157.

Karrer et al., Helv. Chim. Acta., vol. 31, pages 786–794.

ALBERT T. MEYERS, Primary Examiner

J. D. GOLDBERG, Assistant Examiner